United States Patent
Uemura

(10) Patent No.: US 10,462,363 B2
(45) Date of Patent: Oct. 29, 2019

(54) OPTICAL APPARATUS

(71) Applicant: CANON KABUSHIKI KAISHA, Tokyo (JP)

(72) Inventor: Kohei Uemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/902,219

(22) Filed: Feb. 22, 2018

(65) Prior Publication Data

US 2018/0241944 A1  Aug. 23, 2018

(30) Foreign Application Priority Data

Feb. 23, 2017  (JP) .................................. 2017-031961
Feb. 23, 2017  (JP) .................................. 2017-031962

(51) Int. Cl.
*H04N 5/232* (2006.01)
*H04N 5/247* (2006.01)
*H04N 5/225* (2006.01)

(52) U.S. Cl.
CPC ....... *H04N 5/23238* (2013.01); *H04N 5/2254* (2013.01); *H04N 5/2258* (2013.01); *H04N 5/23232* (2013.01); *H04N 5/247* (2013.01)

(58) Field of Classification Search
None
See application file for complete search history.

(56) References Cited

U.S. PATENT DOCUMENTS

2013/0050408 A1* 2/2013 Masuda ............... H04N 5/2253
                                                        348/38
2016/0246038 A1* 8/2016 Amano ................... G02B 13/16
2019/0058870 A1* 2/2019 Rowell .............. H04N 5/23267

FOREIGN PATENT DOCUMENTS

JP   2002-320124 A   10/2002
JP   2013-025255 A   2/2013

* cited by examiner

Primary Examiner — Janese Duley

(57) ABSTRACT

An optical apparatus includes a plurality of first image capturing optical system facing different directions. Each of the first image capturing optical systems includes a reflective element configured to bend an optical path to an image sensor. Optical paths in the first image capturing optical systems intersect with one another on an object side of each reflective element.

14 Claims, 7 Drawing Sheets

OPTICAL APPARATUS

BACKGROUND OF THE INVENTION

Field of the Invention

The present invention relates to an image capturing apparatus suitable for a super wide-field imaging, such as omni-azimuth image capturing and panorama image capturing.

Description of the Related Art

The super wide-field image capturing is used for a variety of fields, such as surveillances, TV conferences, medical endoscopes, and scientific measurements. One super wide-field image capturing method is a technology for combining a plurality of images captured by a plurality of cameras into one continuous image. In this case, when the plurality of optical systems have different entrance pupil positions from one another in these cameras, a parallax occurs among a plurality of captured images obtained by the plurality of cameras and it is difficult to combine these images so as to eliminate a shift of an object.

Japanese Patent Laid-Open No. ("JP") 2002-320124 discloses an image capturing apparatus capable of reducing a parallax among images captured by a plurality of cameras. More specifically, this reference bends an optical path of incident light with a reflective member in captured images in the plurality of cameras, and sets an entrance pupil position outside the optical system (behind or on the image side of the reflective member). Thereby, a plurality of cameras are located so that the entrance pupil positions approximately accord with one another in these optical systems.

JP 2013-25255 discloses an image capturing apparatus that arranges two cameras having an angle of view exceeding 180° and facing opposite sides so that back surfaces of reflective members provided near entrance pupil positions in these optical systems oppose to each other and image planes are opposite to each other with respect to the reflective members. In this image capturing apparatus, the entrance pupil positions in the two cameras can be located close to each other.

However, the image capturing apparatus disclosed in JP 2002-320124 disposes the entrance pupil position closer to the image side than the reflective member and it is difficult to widen an angle of view of the optical system. Hence, many cameras are necessary to widen the imaging field, and the overall image capturing apparatus becomes larger.

The image capturing apparatus disclosed in JP 2013-25255 that uses the optical system with the angle of field exceeding 180° projects an object in a wide field onto a rectangular image sensor using a special projection method different from the general projection method used for the optical system with a smaller angle of field. However, this special projection method inevitably distorts the object image. In particular, the object distorts in the periphery of the angle of field. Thus, it is difficult to remove a large distortion in combining images obtained by the two cameras.

SUMMARY OF THE INVENTION

The present invention provides a small image capturing apparatus capable of easily obtaining a good super wide-field image.

An optical apparatus according to one aspect of the present invention includes a plurality of first image capturing optical system facing different directions. Each of the first image capturing optical systems includes a reflective element configured to bend an optical path to an image sensor. Optical paths in the first image capturing optical systems intersect with one another on an object side of each reflective element.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1:
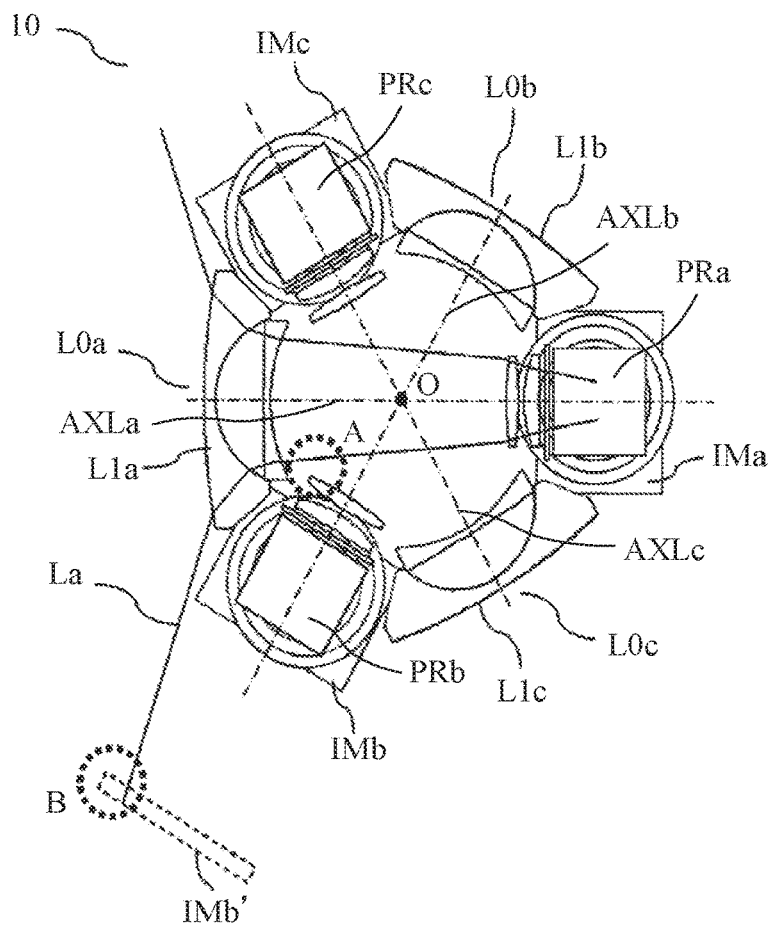
FIG. 1 is a horizontal sectional view of an image capturing apparatus according to a first embodiment of the present invention.

FIG. 1 illustrates a horizontal section viewed from the upper direction of an image capturing apparatus 10 according to a first embodiment of the present invention.

An image capturing apparatus 10 includes a plurality of (three in this embodiment) optical systems L0 (L0a to L0c) that are arranged in a horizontally circumferential direction and face in horizontal orientations different from one another. The three optical systems L0 are arranged so that their optical axes AXL (AXLa to AXLc) intersect with one another at point O between first lens units L1 (L1a to L1c) as an object side optical system and a second lens unit L2 (L2a to L2c) as an image side optical system. The second lens unit L2 includes prisms PR (PRa to PRc) as reflective elements that bend the optical paths in the optical systems L0 to the image sensors IM (IMa to IMc). Each image sensor IM includes a CMOS sensor, a CCD sensor, or the like, and captures (photoelectrically converts) an object image formed by each optical system L0.

The image capturing apparatus 10 according to this embodiment arranges three optical systems L0 at regular angle intervals, which have image capturing angle of view of 120° or higher in the horizontally circumferential direction so as to obtain the image capturing angle of view of 360° in the horizontally circumferential direction. Each optical system L0 is disposed with a wide air interval near the entrance pupil position (nodal point) in the optical system L0. The three optical systems L0 are arranged at the point O in this air interval such that the optical axes AXL intersect with one another at an angle of 120° (intersection angle).

The point O may be the entrance pupil positions of the three optical systems L0. In other words, the three optical systems L0 may be arranged so that their entrance pupil positions accord with one another. This configuration can provide three captured images with few parallaxes through the three optical systems L0. That the entrance pupil positions accord with one another may contain an approximate accordance in a predetermined permissible range as well as an exact accordance.

The image capturing apparatus 10 according to this embodiment performs combining processing that combines three captured images into one continuous image (referred to as "image combining" hereinafter). This configuration can provide a panorama image or a omni-azimuth image. In order to obtain a 360° captured image, three optical systems L0 is used. This configuration can make an image capturing angle of view for each optical system L0 smaller than 180°. This configuration can use a projection method with few distortions of the object image in the periphery of the angle of view in each optical system L0, although this projection method is not available when a plurality of optical systems have image capturing angles of view equal to or higher than 180°. In other words, the images can be easily combined with reduced distortions of the object image in each captured image.

Figure 2:
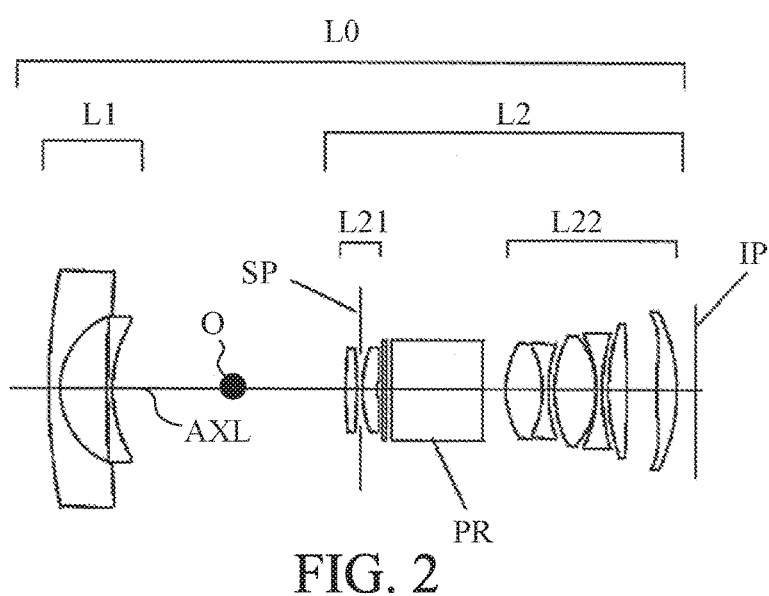
FIG. 2 illustrates a configuration of an optical system in the image capturing apparatus according to the first embodiment.

FIG. 2 illustrates a developed optical configuration of each optical system L0 in which the optical axis AxL linearly extends. In FIG. 2, the left side is an object side, and the right side is an image side (image capturing plane side). The optical system L0 includes, in order from the object side, the first lens unit L1 and the second lens unit L2. The second lens unit L2 includes, in order from the object side, an object side lens unit L2a, the above prism PR, and an image side lens unit L22. SP represents an aperture stop (diaphragm), and disposed between an area (point O) where the optical paths in three optical systems L0 intersect with one another, and the prism PR. IP represents an image plane on which the image capturing plane of the image sensor IM is disposed.

Next follows lens data 1 as a specific numerical example of each optical system L0. In the lens data 1, "i" represents an order from the object side, "ri" represents a radius of curvature of an optical plane (i-th plane), and "di" represents an axial distance between the i-th plane and the (i+1)-th plane. In addition, "ndi" and "vdi" represent a refractive index and an Abbe number of a material in the i-th optical member for the d-line. In the lens data 1, an asterisked aspheric shape is expressed by the following expression where the optical axis is set to an X direction, an direction orthogonal to the optical axis is set to an H axis, a light traveling direction is set positive, R is a paraxial radius of curvature, K is a conical constant, A4, A6, A8, A10, and A12 are aspheric coefficients.

$$x = \frac{H^2/R}{1+\sqrt{1-(1+K)(H/R)^2}} +$$ (Expression 1)

$$A4H^4 + A6H^6 + A8H^8 + A10H^{10} + A12H^{12}$$

In the aspheric coefficient, "e-x" means $10^{-x}$. BF is an air-converted back focus.

(Lens Data 1)

Unit mm

Surface data

| Surface Number | r | d | nd | vd | effective diameter |
|---|---|---|---|---|---|
| 1 | 95.897 | 1.80 | 1.76385 | 48.5 | 36.02 |
| 2* | 12.471 | 7.52 | | | 22.60 |
| 3* | 238.647 | 1.00 | 1.59522 | 67.7 | 22.02 |
| 4 | 22.358 | 37.39 | | | 20.19 |
| 5 | 55.727 | 1.88 | 1.59522 | 67.7 | 12.11 |
| 6 | −46.082 | 0.44 | | | 11.85 |
| 7(Aperture stop) | ∞ | 0.47 | | | 11.79 |
| 8 | 17.811 | 2.39 | 1.43875 | 94.7 | 12.39 |
| 9 | 122.566 | 1.00 | | | 12.44 |
| 10 | ∞ | 0.50 | 1.51633 | 64.1 | 15.00 |
| 11 | ∞ | 0.75 | | | 15.00 |
| 12 | ∞ | 15.00 | 1.77250 | 49.6 | 15.00 |
| 13 | ∞ | 3.38 | | | 15.00 |
| 14 | 14.079 | 5.90 | 1.43875 | 94.7 | 14.04 |
| 15 | −15.606 | 0.90 | 1.95375 | 32.3 | 13.41 |
| 16* | 23.937 | 1.11 | | | 13.68 |
| 17 | 18.432 | 6.78 | 1.43875 | 94.7 | 15.52 |
| 18 | −13.256 | 0.14 | | | 16.25 |
| 19 | −18.534 | 0.95 | 2.00100 | 29.1 | 16.02 |
| 20 | 34.058 | 0.95 | | | 17.45 |
| 21 | 36.205 | 2.95 | 1.92286 | 18.9 | 19.73 |
| 22 | −160.913 | 4.73 | | | 20.21 |
| 23* | 60.430 | 3.21 | 1.49710 | 81.6 | 23.11 |
| 24 | −27.772 | (Variable) | | | 23.84 |
| Image plane | ∞ | | | | |

Aspheric data

Second surface

K = −3.16579e−002 A 4 = 4.78621e−006 A 6 = −1.93434e−007
A 8 = 3.88320e−009 A10 = −1.73981e−011
Third surface K = 0.00000e+000 A 4 = −7.66786e−006 A 6 = 2.55313e−007
A 8 = −2.24042e−009 A10 = 6.06241e−012
Sixteenth surface K = 0.00000e+000 A 4 = 5.78337e−005 A 6 = 8.92017e−008
A 8 = −2.22233e−009 A10 = 3.26267e−011
Twenty-third surface K = 0.00000e+000 A 4 = −9.93607e−005 A 6 = 4.48034e−007
A 8 = −3.58066e−009 A10 = 5.67429e−012

Various data

| Zoom ratio | 1.00 |
|---|---|
| Focal length | 9.90 |
| F-number | 4.00 |
| Half angle of view | 79.06 |
| Image height | 13.66 |
| Lens overall length | 104.14 |
| BF | 3.00 |
| d24 | 3.00 |
| Entrance pupil position | 12.51 |
| Exit pupil position | −73.10 |
| Front side principal point position | 21.12 |
| Back side principal point position | −6.90 |

-continued

Unit mm

Zoom lens unit data

| Unit | starting surface | focal length | lens structure length |
|---|---|---|---|
| 1 | 1 | 9.90 | 101.14 |

| Unit | Front side principal point position | Back side principal point position |
|---|---|---|
| 1 | 21.12 | −6.90 | lens unit data

| Unit | starting surface | focal length | lens structure length |
|---|---|---|---|
| 1 | 1 | −11.48 | 10.32 |
| 2 | 5 | 30.96 | 53.43 |

| Unit | Front side principal point position | Back side principal point position |
|---|---|---|
| 1 | 3.41 | −4.82 |
| 2 | 13.20 | −54.68 |

Single lens data

| lens | starting surface | focal length |
|---|---|---|
| 1 | 1 | −18.94 |
| 2 | 3 | −41.52 |
| 3 | 5 | 42.67 |
| 4 | 8 | 47.17 |
| 5 | 10 | 0.00 |
| 6 | 12 | 0.00 |
| 7 | 14 | 17.96 |
| 8 | 15 | −9.80 |
| 9 | 17 | 18.80 |
| 10 | 19 | −11.88 |
| 11 | 21 | 32.26 |
| 12 | 23 | 38.75 |

Figure 3:
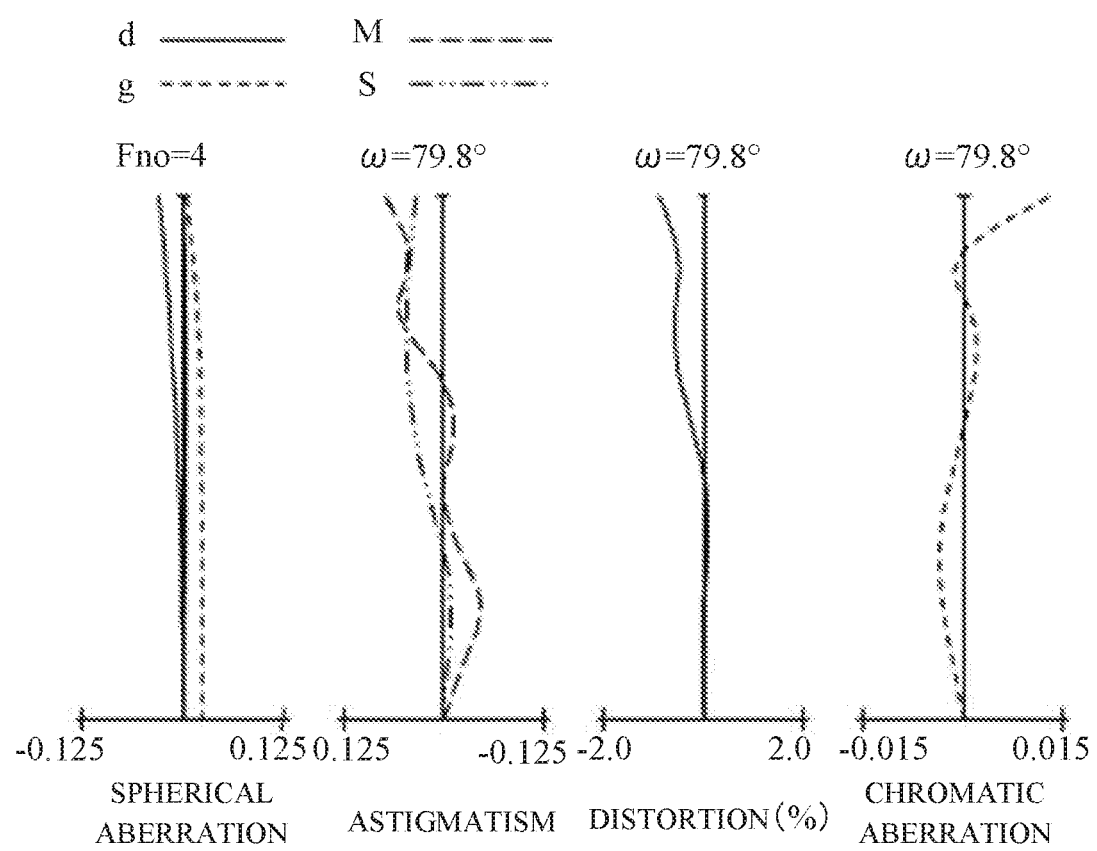
FIG. 3 is an aberrational view of the optical system according to the first embodiment (numerical example).

FIG. 3 illustrates a variety of aberrations of the optical system L0 in the above numerical example (such as the spherical aberration, astigmatism, distortion, and lateral chromatic aberration). In the spherical aberration, Fno represents an F-number. "d" represents a d-line with a wavelength of 587.6 nm, and "g" represents a g-line with a wavelength of 435.8 nm. In the astigmatism, "M" represents a meridional image plane to the d-line, and "S" represents a sagittal image plane to the d-line. The distortion relates to the d-line. The lateral chromatic aberration relates to the g-line relative to the d-line. "ω" represents a half angle of view (degree).

The optical system L0 according to this embodiment adopts an equidistant projection method as a projection method. The equidistant projection method is expressed as y=f·θ, where f is a focal length of the optical system L0, θ (radian) is an image capturing angle of view, and y is a size of the image. Hence, the distortion illustrated in FIG. 3 is a shift from an ideal image height in the equidistant projection method. As illustrated, the distortion is well restrained up to the periphery of the angle of view.

This embodiment optimizes the refractive power of each optical system L0 so as to miniaturize the whole image capturing apparatus while the entrance pupil positions accord with or are close to one another in the three optical systems L0 for easy image combining. Each optical system L0 includes the first lens unit having a negative refractive power disposed on the object side and the second lens unit L2 having a positive refractive power disposed on the image side with respect to the maximum distance (containing the point O) among the axial distances between adjacent lenses in the optical axis direction in which the optical axis AXL extends. Assume that L is a lens distance between the first lens unit L1 and the second lens unit L2, f is a focal length of the whole system, and f1 is a focal length of the first lens unit L1. Then, the horizontal optical system L0 satisfies the following conditions.

$$3.20 \leq L/f \leq 5.50 \tag{1}$$

$$-0.60 \leq f1/L \leq -0.10 \tag{2}$$

The conditions (1) and (2) have the following technical meanings. In FIG. 1, A represents an area in which a non-axial light flux La that passes the first negative lens unit L1a and enters the second positive lens unit L2a in the optical system L0a can interferes with the second lens unit L2b in another optical system L0b and an unillustrated lens barrel that holds the second lens unit L2b. The conditions (1) and (2) are conditions necessary to achieve a small and high-performance whole optical system (or the entire image capturing apparatus 10) while reducing the possible light interference. When the first lens unit L1 has a negative refractive power (or the absolute value of the negative refractive power is large), the non-axial light flux that has passed the first lens unit L1 can approach to the optical axis AXL and it is easy to reduce the interference between the non-axial light flux and the second lens unit L2 in the other optical system L0. This interference can be also reduced by extending the lens distance L between the first and second lens units L1 and L2, but a large size of the optical system L0 is not suitable. For the small configuration of the optical system L0 and the reduced light interference possibility, it is necessary to properly set the negative refractive power of the first lens unit L1 relative to the lens distance L.

The condition (1) is necessary for a small configuration of the optical system L0. When the lens distance L becomes too long so that the value is higher than the upper limit in the condition (1), the optical system L0 becomes unsuitably larger although the light interference among the plurality of optical systems L0 reduces. When the lens distance L becomes too short so that the value is lower than the lower limit in the conditional expression (1), the light interference is more likely to occur among the plurality of optical systems L0 increases.

More specifically, the upper and lower limits in the condition (1) may satisfy the following condition.

$$3.25 \leq L/f \leq 5.00 \tag{1}'$$

When the negative refractive index of the first lens unit L1 is excessively strong so that the value exceeds the upper limit in the condition (2), the possible light interference reduces but lots of curvature of fields occur and it is difficult to maintain a high optical performance. The first lens unit may also have more lenses for a high optical performance, but the lens closest to the object has a large effective diameter and causes a physical interference between optical systems L0. When the first lens unit L1 has a weak negative refractive power (or the negative refractive power has a small absolute value) such that the value is smaller than the lower limit in the condition (2), the light flux that passes the first lens unit L1 in each optical system L0 is separated from the optical axis AXL and likely to interfere with the second lens unit L2 in the other optical system L0.

More specifically, the upper and lower limits in the condition (2) may satisfy the following condition.

$$-0.55 \leq f1/L \leq -0.15 \tag{2}'$$

In the image capturing apparatus 10 according to this embodiment, the optical system L0 satisfies the conditions (1) (or (1)') and (2) (or (2)'), reducing the interferences among the optical systems L0 and realizing a small and high-performance optical system as a whole. Table 1 indicates values of the conditions (1) and (2) in the lens data 1.

TABLE 1

| Conditions | Calculated value based on numerical value data |
|---|---|
| (1) L/f | 4.28 |
| (2) f1/L | −0.31 |

When the three optical systems L0 are arranged on the same plane at regular intervals of 120°, the first lens unit L1 and the image sensor IM in each optical system L0 are adjacent to those in other optical systems L0. For a high-quality image, the image sensor IM needs to be enough large but then part of incident light may enter the image sensor IM for the adjacent optical system L0.

Hence, this embodiment bends the optical paths of the three optical systems L0 in the downward direction through the reflective surfaces of the prisms PR (which may be the upper directions as long as they are the same directions). In FIG. 1, B represents an area in which the light flux La that enters the other optical system L0a interferes with the image sensor 1 Mb' where the optical system L0b has no prism PR. A blind spot area extends if the angle of view is narrowed in the optical system L0 in order to avoid the interference between the light flux La and the image sensor IMb' in the area B. An attempt to avoid the interference without narrowing the angle of view would unsuitably limit the size of the image sensor IMb'.

Providing the prism PR as in this embodiment can prevent the interference between the light flux La that enters the first lens unit L1 and the image sensor IM and enable the image sensor IM to be larger. In addition, the prism PR is disposed in the second lens unit L2. In other words, the three optical systems L0 bend the optical paths while maintaining a space used to enable their optical axes AXL to intersect with one another. Moreover, the prism PR is disposed near the aperture stop SP in which the effective ray diameter is reduced in the optical system L0. Thereby, the prism PR can be made small and consequently the entire image capturing apparatus 10 can be made small.

Figure 4A:
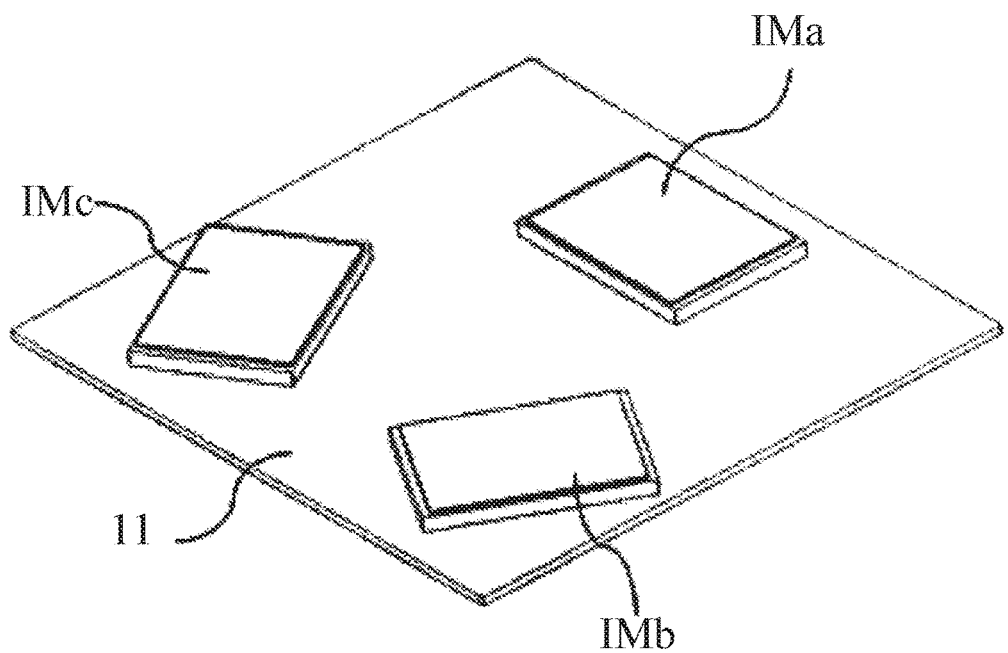
FIGS. 4A and 4B illustrate an arrangement of image sensors in the image capturing apparatus according to the first embodiment.

FIG. 4A illustrates an arrangement of the three image sensors IM in the image capturing apparatus 10 according to this embodiment. The three optical systems L0 have the same configurations, and are rotationally symmetrically arranged with respect to the point O in which the optical axes AXL intersect with one another. The prisms PR bend parts of the optical axes AXL in the three optical systems L0 from the prisms PR to the image sensors IM so as to arrange them parallel to one another. Thereby, the image planes IP in the three optical systems L0 or the image capturing planes of the three image sensors IM are level with one another. In other words, the three image sensors IM are arranged on the same plane. The three image sensors IM may be mounted on the independent printed wiring substrates or the same printed wiring substrate 11, as illustrated in FIG. 4A.

Figure 4B:
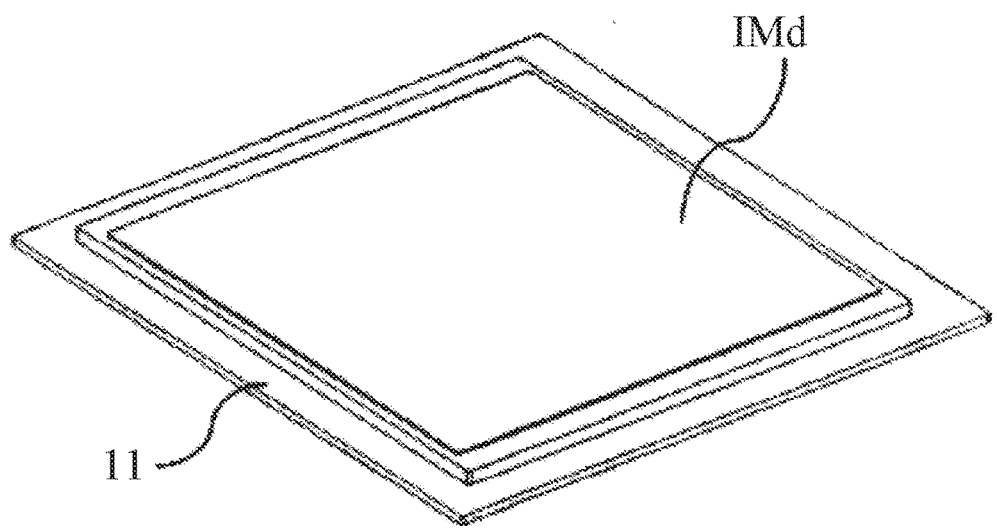

Moreover, as illustrated in FIG. 4B, the three image sensors IM may be replaced with one (single) image sensor IMd. Thereby, the number of components in the image capturing apparatus 10 may be saved.

This embodiment can provide a small and high-performance image capturing apparatus 10 in which the entrance pupil positions accord with or are close to one another in the plurality of optical systems L0 used to capture a super wide-field image.

Second Embodiment

Figure 5:
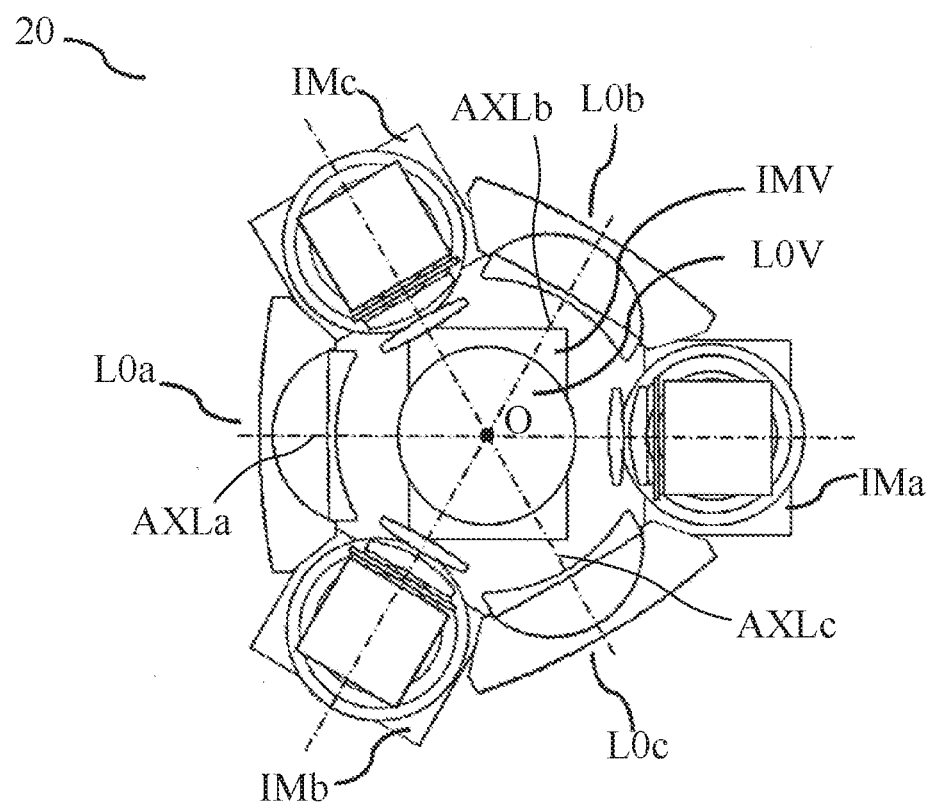
FIG. 5 is a horizontal sectional view of a plurality of optical systems in an image capturing apparatus according to a second embodiment of the present invention.
Figure 6A:
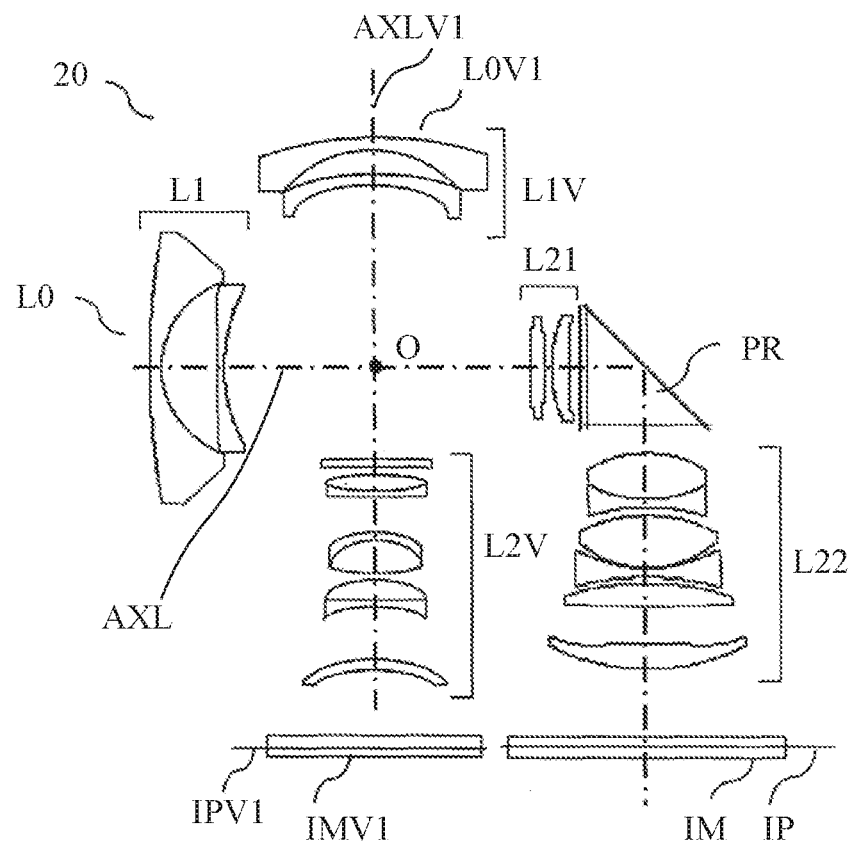
FIGS. 6A and 6B illustrate a side sectional view of an image capturing apparatus according to the second embodiment of the present invention and a view of an arrangement of image sensors.
Figure 6B:
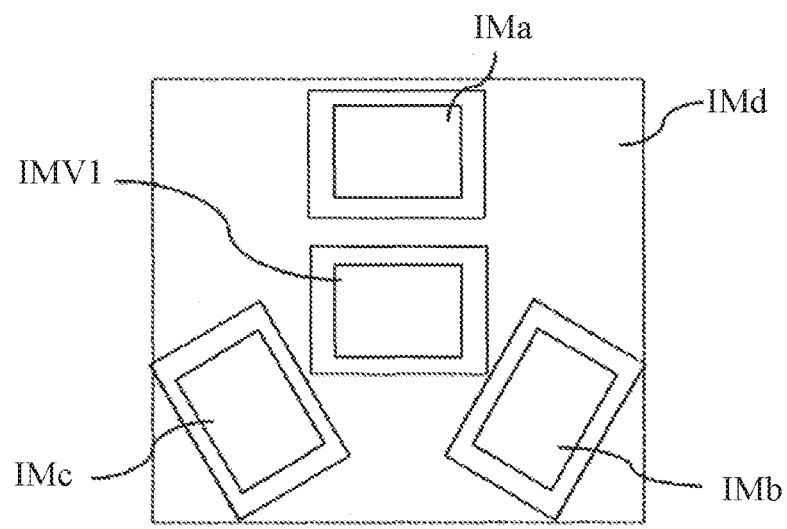

FIG. 5 illustrates a horizontal section of an image capturing apparatus 20 according to a second embodiment of the present invention. FIG. 6A illustrates a side section of the image capturing apparatus 20 according to this embodiment. The image capturing apparatus 20 according to this embodiment includes an optical system L0V1 (referred to as a "zenithal optical system" hereinafter) that faces the upper orientation (zenith) in addition to the same three horizontal optical systems L0 (L0a to L0c) as the three optical systems L0 that face the horizontal direction in the image capturing apparatus 10 according to the first embodiment. FIG. 6B illustrates an arrangement of the image sensors according to this embodiment. In FIGS. 5, 6A, and 6B, the components in the first embodiment will be designated by the same reference numerals.

The zenithal optical system L0V1 has an image capturing angle of view of 99.94°. The zenithal optical system L0V is disposed so that its optical axis AXLV1 passes or intersects with the point O at which the optical axes AXL (AXLa to AXLc) in the three horizontal optical systems L0 intersect with one another. The point O may be the entrance pupil position of the zenithal optical system L0V1 as well as the entrance pupil positions of the three horizontal optical systems L0.

As illustrated in FIG. 6A, the zenithal optical system L0V1 includes, in order from the object side (or upper side in FIG. 6A), a first lens unit L1V1 as the object side optical system and a second lens unit L2V1 as the image side optical system. A space area that contains the point O is provided between the first lens unit L1V1 and the second lens unit L2V1, similar to each horizontal optical system L0. Even when the zenithal optical system L0V1 and the three horizontal optical systems L0 are arranged so that they intersect with one another, their optical paths may not interfere with one another. Thus, this embodiment space-efficiently arranges the three horizontal optical systems L0 and the zenithal optical system L0V1, and makes small the image capturing apparatus 20, in particular, in the horizontal direction.

The zenithal optical system L0V1 is disposed so that the optical axis AXLV1 is parallel to the optical axis AXL from the prism PR to the image sensor IM in the second lens unit L2 in each horizontal optical system L0. Thereby, the image plane IPV1 in the zenithal optical system L0V1 is parallel to the image plane IP in the horizontal optical system L0.

In this embodiment, as illustrated in FIG. 6A, the image plane IPV1 is level with the image plane IP. As illustrated in FIGS. 6A and 6B, the image capturing plane of the image sensor IMV1 is disposed on the image plane IPV1, and the image capturing plane of the image sensor IM (IMa to IMc) is disposed on the image plane IP. Similar to the first embodiment, the image sensors IMV1 and IM may be mounted on the same unillustrated printed wiring substrate. As illustrated by a broken line in FIG. 6B, similar to FIG. 4B in the first embodiment, the image sensors IMV1 and IM can be replaced with one (single) image sensor IMd. Thereby, the number of components in the image capturing apparatus 20 can be saved.

This embodiment can provide a small and high-performance image capturing apparatus 20 in which the entrance pupil positions accord with or are close to one another in the plurality of optical systems L0 and L0V1 used to capture a super wide-field image including the zenith.

Next follows lens data 2 as a specific numerical example of the zenithal optical system L0V. Each letter described in the lens data 2 have the same meaning as that in the lens data 1.

(Lens Data 2)

Unit mm

Surface data

| Surface Number | r | d | nd | vd | effective diameter |
|---|---|---|---|---|---|
| 1* | 43.407 | 0.80 | 1.76385 | 48.5 | 22.56 |
| 2 | 11.343 | 2.96 | | | 17.71 |
| 3 | 24.927 | 0.80 | 1.55332 | 71.7 | 17.50 |
| 4 | 12.299 | 29.92 | | | 15.92 |
| 5 | 31.672 | 0.98 | 1.63980 | 34.5 | 8.16 |
| 6 | 6592.626 | 0.20 | | | 8.37 |
| 7(Aperture stop) | ∞ | 0.01 | | | 8.47 |
| 8 | 9.563 | 2.41 | 1.59522 | 67.7 | 9.04 |
| 9 | −37.652 | 0.50 | 1.88300 | 40.8 | 8.92 |
| 10 | −381.814 | 3.91 | | | 8.88 |
| 11* | 34.406 | 0.50 | 1.85400 | 40.4 | 8.31 |
| 12 | 6.253 | 2.74 | 1.43875 | 94.9 | 8.09 |
| 13 | −29.902 | 0.47 | | | 8.42 |
| 14 | 7.312 | 2.75 | 1.43875 | 94.9 | 9.38 |
| 15 | −113.177 | 0.64 | 1.88300 | 40.8 | 9.13 |
| 16 | 9.559 | 6.99 | | | 8.82 |
| 17* | 19.128 | 1.42 | 1.55332 | 71.7 | 13.78 |
| 18 | 27.427 | (Variable) | | | 13.78 |
| Image plane | ∞ | | | | |

Aspheric data

First surface

K = 0.00000e+000 A 4 = −8.76929e−006 A 6 = 1.66621e−007
A 8 = −1.56200e−009 A10 = 8.25955e−012 A12 = −1.65844e−014

Eleventh surface

K = 0.00000e+000 A 4 = −1.95235e−004 A 6 = −6.83768e−007
A 8 = −4.60527e−008 A10 = 9.12215e−010

Seventeenth surface

K = 0.00000e+000 A 4 = 9.19014e−005 A 6 = −5.16677e−007
A 8 = 2.13838e−008 A10 = −1.65526e−010

Various data

| Zoom ratio | 1.00 |
|---|---|
| Focal length | 8.60 |
| F-number | 3.66 |
| Half angle of view | 49.97 |
| Image height | 7.50 |
| Lens overall length | 63.00 |
| BF | 5.00 |
| d18 | 5.00 |
| Entrance pupil position | 11.16 |
| Exit pupil position | −15.67 |
| Front side principal point position | 16.18 |
| Back side principal point position | −3.60 |

Zoom lens unit data

| Unit | starting surface | focal length | lens structure length |
|---|---|---|---|
| 1 | 1 | 8.60 | 58.00 |

| Unit | Front side principal point position | Back side principal point position |
|---|---|---|
| 1 | 16.18 | −3.60 |

Single lens data

| lens | starting surface | focal length |
|---|---|---|
| 1 | 1 | −20.32 |
| 2 | 3 | −44.88 |
| 3 | 5 | 49.74 |
| 4 | 8 | 13.06 |
| 5 | 9 | −47.34 |
| 6 | 11 | −9.02 |
| 7 | 12 | 12.07 |
| 8 | 14 | 15.76 |
| 9 | 15 | −9.96 |
| 10 | 17 | 107.68 |

Third Embodiment

Figure 7A:
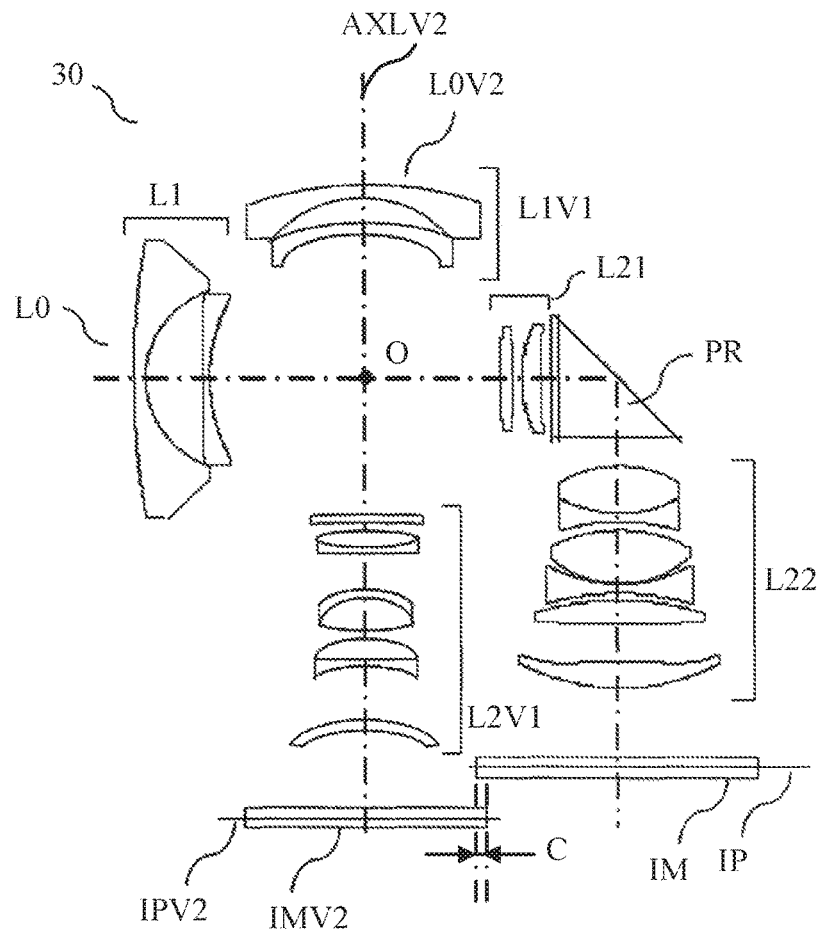
FIGS. 7A and 7B illustrate a side sectional view of an image capturing apparatus according to a third embodiment of the present invention and a view of an arrangement of image sensors.
Figure 7B:
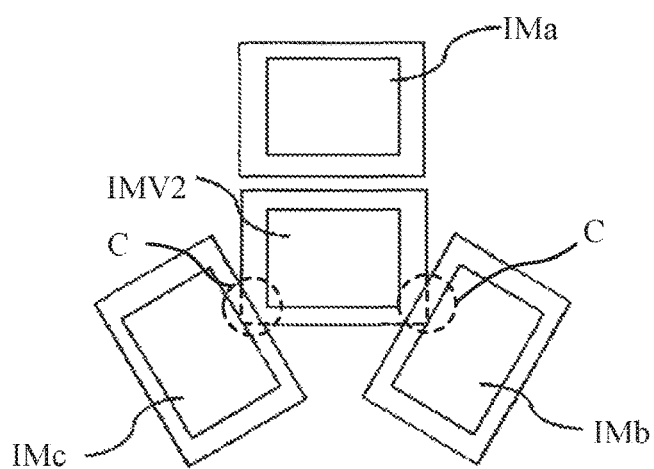

FIG. 7A illustrates a side section of an image capturing apparatus 30 according to a third embodiment of the present invention. The basis configuration of the three horizontal optical systems L0 and a zenithal optical system L0V2 in this embodiment is the same as that of the three horizontal optical systems L0 and the zenithal optical system L0V1 in the second embodiment. FIG. 7B illustrates an arrangement of image sensors according to this embodiment. In FIGS. 7A and 7B, the corresponding elements in the second embodiment will be designated by the same reference numerals.

This embodiment provides an image plane IPV2 in the zenithal optical systems L0V2 (image sensor IMV2) under or on the image side of the image planes IP (image sensors IM) in the three horizontal optical systems L0. This configuration enables the image sensors IM (IMa to IMc) in the horizontal optical systems L0 close to the optical axis AXLV2 in the zenithal optical system L0V2 in a noninterference range with an optical path from the zenithal optical system L0V2 to the image sensor IMV2. Thereby, the image capturing apparatus 30 can be made small in the horizontal direction.

As illustrated in FIGS. 7A and 7B, the image sensors IM in the horizontal optical systems L0 may overlap part C in the image sensor IMV2 in the optical axis direction (optical path extending direction) in a noninterference range with the image capturing plane of the image sensor IMV2. Thereby, the image capturing apparatus 30 may be made smaller in the horizontal direction.

Fourth Embodiment

Figure 8A:
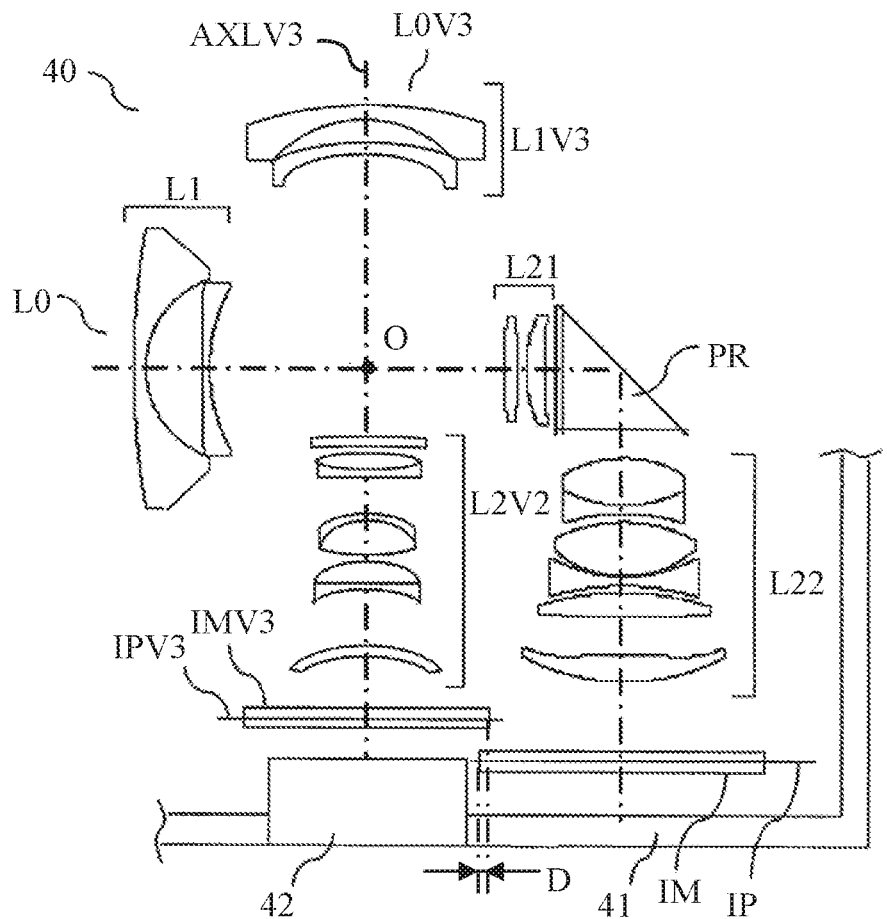
FIGS. 8A and 8B illustrate a side sectional view of an image capturing apparatus according to a fourth embodiment of the present invention and a view of an arrangement of image sensors.
Figure 8B:
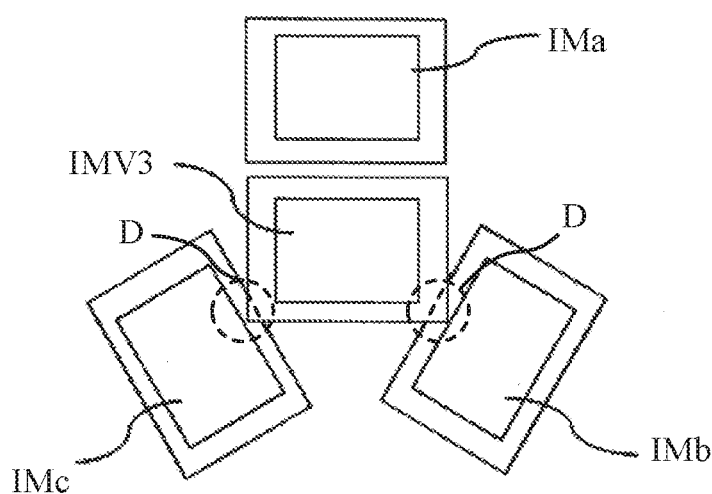

FIG. 8A illustrates a horizontal section of an image capturing apparatus 40 according to a fourth embodiment of the present invention. The basis configuration of the three horizontal optical systems L0 and a zenithal optical system L0V3 in this embodiment is the same as that of the three horizontal optical systems L0 and the zenithal optical system L0V1 in the second embodiment. FIG. 8B illustrates an arrangement of image sensors according to this embodiment. In FIGS. 8A and 8B, the corresponding elements in the second embodiment will be designated by the same reference numerals.

This embodiment provides an image plane IPV3 (image sensors IMV3) in the three horizontal optical systems L0V3 above or on the object side of the image planes IP (image sensors IM) in the three horizontal optical systems L0. This configuration arranges the image sensors IM (IMa to IMc) in the horizontal optical systems L0 close to the optical axis AXLV3 in the zenithal optical system L0V3 in a noninterference range with the optical path from the zenithal optical system L0V3 to the image sensor IMV3. Thereby, the image capturing apparatus 40 can be made small in the horizontal direction.

As illustrated in FIGS. 8A and 8B, the image sensors IM may overlap part D in the image sensor IMV3 in the zenithal optical system L0V3 in a noninterference range with the image sensors IM in the horizontal optical systems L0. Thereby, the image capturing apparatus 40 may be made smaller in the horizontal direction.

The image capturing apparatus 40 in this embodiment includes a structure (body) 41 that holds the three horizontal optical systems L0 and the zenithal optical system L0V3. A leg seat 42 mechanically connectable with an external structure, such as a tripod, under the image sensor IMV3 on the bottom surface part in the structure 41. This embodiment can dispose the image sensor IMV3 closer to the object side than the image sensors IM so as to avoid the leg seat 42. In other words, the structure 41 can be provided without projecting the leg seat 42 downwardly, and consequently the image capturing apparatus 40 can be made small. The component located under the image sensor IMV3 is not limited to the leg seat 42, and another component, such as a power source, may be disposed.

While each embodiment uses the prism PR as a reflective element, another reflective element, such as a mirror, may be provided.

While each embodiment describes an image capturing apparatus that obtains an image capturing angle of view of 360° through the three optical systems L0, four or more optical systems may be used to obtain an image capturing angle of view of 360° or two optical systems may be used to obtain an image capturing angle of view less than 360°.

While each embodiment arranges the three optical systems L0 so that their optical axes intersect with one another with an intersection angle of 120°, each optical system L0 may have a different intersection angle depending on the image capturing angle of view.

While each embodiment arranges three optical systems L0 in the horizontally circumferential direction, each optical system may be disposed with an angle in the vertical direction relative to the horizontal surface, for example, so that they face upper oblique directions.

Each embodiment can provide a small image capturing apparatus that can easily obtain a good super wide-field image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2017-031961, filed on Feb. 23, 2017, 2017-031962, filed on Feb. 23, 2017, each of which is hereby incorporated by reference herein in its entirety.

What is claimed is:

1. An optical apparatus comprising a plurality of first image capturing optical systems facing different directions,
wherein each of the first image capturing optical systems includes a reflective element configured to bend an optical path to an image sensor,
wherein optical paths in the first image capturing optical systems intersect with one another on an object side of each reflective element,
wherein each of the first image capturing optical systems includes, in order from the object side, a first lens unit having a negative refractive power, and a second lens unit having a positive refractive power, the second lens unit including the reflective element configured to bend the optical path to the image sensor, and
wherein in each of the first image capturing optical systems, a condition of $3.205 \leq L/f \leq 5.50$ is satisfied, where L is a distance between the first lens unit and the second lens unit, and f is a focal length of a whole optical system.

2. An optical apparatus comprising a plurality of first image capturing optical systems facing different directions,
wherein each of the first image capturing optical systems includes a reflective element configured to bend an optical path to an image sensor, and
wherein optical paths in the first image capturing optical systems intersect with one another on an object side of each reflective element,
wherein each of the first image capturing optical systems includes, in order from the object side, a first lens unit having a negative refractive power, and a second lens unit having a positive refractive power, the second lens unit including the reflective element configured to bend the optical path to the image sensor, and
wherein a condition of $-0.60 \leq f1/L \leq -0.10$ is satisfied, where L is a distance between the first lens unit and the second lens unit, and f1 is a focal length of the first lens unit.

3. The optical apparatus according to claim 1, wherein an intersection position at which the optical paths intersect with one another in the first image capturing optical systems is a nodal point.

4. The optical apparatus according to claim 1, further comprising a plurality of image sensors corresponding to the first image capturing optical systems and arranged on the same substrate.

5. The optical apparatus according to claim 1, further comprising a single image sensor corresponding to the first image capturing optical systems.

6. The optical apparatus according to claim 1, further comprising a second image capturing optical system having no reflective element in the optical path to the image sensor.

7. The optical apparatus according to claim 6, wherein an intersection position of the optical paths of the first image capturing optical systems and the optical path of the second image capturing optical system is a nodal point.

8. The optical apparatus according to claim 6, wherein the plurality of first optical systems are rotationally symmetrically provided with respect to an optical axis in the second image capturing optical system as a center.

9. The optical apparatus according to claim 2, wherein an intersection position at which the optical paths intersect with one another in the first image capturing optical systems is a nodal point.

10. The optical apparatus according to claim 2, further comprising a plurality of image sensors corresponding to the first image capturing optical systems and arranged on the same substrate.

11. The optical apparatus according to claim 2, further comprising a single image sensor corresponding to the first image capturing optical systems.

12. The optical apparatus according to claim 2, further comprising a second image capturing optical system having no reflective element in the optical path to the image sensor.

13. The optical apparatus according to claim 12, wherein an intersection position of the optical paths of the first image capturing optical systems and the optical path of the second image capturing optical system is a nodal point.

14. The optical apparatus according to claim 12, wherein the plurality of first optical systems are rotationally symmetrically provided with respect to an optical axis in the second image capturing optical system as a center.

* * * * *